United States Patent [19]

Tsuchiya et al.

[11] Patent Number: 4,730,010

[45] Date of Patent: Mar. 8, 1988

[54] QUARTERNARY AMMONIUM GROUP-CONTAINING RESINS FOR USE IN CATHODIC ELECTRODEPOSITION COATING SYSTEMS

[75] Inventors: Yasuyuki Tsuchiya, Hirakata; Koji Ito, Ibaraki; Koichi Hagihara; Hiroyuki Sakamoto, both of Nishinomiya; Yutaka Otsuki, Yokohama, all of Japan

[73] Assignees: Nippon Paint Co., Ltd., Osaka; Nippon Oil Company, Ltd., Tokyo, both of Japan

[21] Appl. No.: 844,643

[22] Filed: Mar. 27, 1986

[30] Foreign Application Priority Data

Apr. 1, 1985 [JP] Japan .................................. 60-69635

[51] Int. Cl.[4] ............................................. C08K 3/20
[52] U.S. Cl. .................................. 523/403; 525/217; 525/233
[58] Field of Search ........................................ 523/403

[56] References Cited

U.S. PATENT DOCUMENTS

| 4,035,275 | 7/1977 | Sturni et al. | 204/181.7 |
| 4,370,453 | 1/1983 | Omika et al. | 525/451 |
| 4,379,890 | 4/1983 | Konietzny et al. | 525/337.8 |

FOREIGN PATENT DOCUMENTS

A-2911243 10/1980 Fed. Rep. of Germany .

*Primary Examiner*—Joseph L. Schofer
*Assistant Examiner*—Bernard Lipman
*Attorney, Agent, or Firm*—Millen & White

[57] ABSTRACT

A cationic water-dispersible resin having quarternary ammonium groups is produced by reacting an acid-addition salt of a polymeric tertiary amine derived from a partially epoxidized polybutadiene-based polymer with an aliphatic secondary amine. The cationic water-dispersible resin is useful for preparing pigment paste and coating compositions to be used in cathodic electrodeposition coating systems.

8 Claims, No Drawings

QUARTERNARY AMMONIUM GROUP-CONTAINING RESINS FOR USE IN CATHODIC ELECTRODEPOSITION COATING SYSTEMS

TECHNICAL FIELD AND BACKGROUND OF THE INVENTION

This invention relates to a novel water-dispersible resin having quarternary ammonium groups. It also relates to a pigment paste composition and a coating composition for use in cathodic electrodeposition coating systems.

Polybutadiene-based cathodic electrodepositing coating compositions are known. These compositions contain a cationic water-dispersible resin produced by reacting partially epoxydized homopolymers or copolymers of butadiene, a primary or secondary amine and optionally acrylic or methacrylic acid. See, Japanese Laid Open Patent Application Nos. 51-119727, 52-147638, 53-16048 and 56-151777.

Since the cathodic electrodeposition coating utilizes an electrochemical reaction in which cationic resin particles and other solid particles are insolubilized and deposited on a cathode-acting substrate article as the concentration of hydroxyl ions produced by the electrolysis of water increases at the vicinity of cathode, the solid content of the coating bath will decrease with time. Therefore, it is necessary to replenish various components to the bath from time to time. In case of electrodeposition enamels, it is simple and has been commercial practice to replenish pigments as pigment paste.

It is desirable for the pigment paste to have a pigment volume concentration (PVC) as high as possible. Such pigment paste has been conventionally prepared from a resin having the same secondary or tertiary amine function as he main film-forming resin. For example, polybutadiene-based cathodic electrodeposition coating systems disclosed in the above-cited references utilize a reaction product of partially epoxidized polybutadiene and a primary or secondary amine in the pigment paste. However, it has been found that when pigments are dispersed, particularly at a high PVC concentration, in an aqueous solution of a neutralizate of the above reaction product, difficulties can be encountered in achieving uniform dispersion of the pigment particles and also in the storage stability of the resulting pigment paste and coating compositions containing them.

SUMMARY OF THE INVENTION

Accordingly, it is a principal object of the present invention to provide a novel cationic water-dispersible resin having quarternary ammonium groups suitable for preparing pigment paste having a high PVC content and improved storage stability to be used in a cathodic electrodeposition coating system.

It is another object of the invention to provide pigment paste and coating compositions containing the water-dispersible resin having quarternary ammonium groups.

Other objects of this invention will become apparent as the description proceeds.

According to one aspect of the present invention, there is provided a cationic water-dispersible resin having quarternary ammonium groups comprising a product produced by reacting (a) an acid-addition salt of a polymeric tertiary amine derived from a partially epoxidized homopolymer or copolymer of butadiene having a molecular weight of 500 to 5,000 and an aliphatic secondary amine, and (b) a mono-epoxide compound.

The quarternized resin of the present invention exhibits a greater affinity to pigment particles than corresponding resins having secondary or tertiary amino groups and thus may greatly improve the dispersibility and stability of pigment particles in the pigment paste.

According to another aspect of the present invention, a pigment paste composition is provided comprising an aqueous solution of the above quarternized resin and a quantity of pigment uniformly dispersed in said solution. The ratio of said resin to pigment may range from 1:1 to 1:5 by weight on dry basis.

The quarternized resin of the present invention may significantly improve the film smoothness and corrosion resistance of polybutadiene-based cathodic electrodeposition coating compositions when incorporating thereto. Thus, the present invention provides, in its further aspect, a cathodic electrodeposition coating composition which comprises an aqueous solution or dispersion containing:

(A) a reaction product of a partially epoxidized homopolymer or copolymer of butadiene having a molecular weight of 500 to 5,000 with an aliphatic secondary amine and optionally with an ethylenically unsaturated polymerizable carboxylic acid;

(B) a reaction product of a polyphenol polyglycidyl ether with an ethylenically unsaturated polymerizable carboxylic acid;

(C) an oxide or an organic acid salt of manganese, cobalt or copper; and (D) the quarternized resin as hereinbefore defined; said solution or dispersion containing an amount of an organic acid sufficient to neutralize said component (A).

A cathodic electrodeposition coating enamel may be provided by replacing the component (D) of the above composition with the pigment paste as hereinbefore defined.

The above coating compositions and enamels may be applied on a substrate article using conventional cathodic electrodeposition coating techniques and the resulting films may be cured by baking at a temperature of 120° C. to 200° C. to give a smooth finish having an excellent corrosion resistant property. The curing takes place through an oxidative polymerization reaction of the carbon-to-carbon double bond function remaining in the modified polybutadiene components and also through a radical polymerization reaction of ethylenically unsaturated carboxyl groups.

DETAILED DESCRIPTION OF THE INVENTION WATER-DISPERSIBLE RESIN CONTAINING QUARTERNARY AMMONIUM GROUPS

The starting polymeric tertiary amines may be those disclosed in hereinbefore cited Japanese Laid Open Patent Applications and their family U.S. Pat. Nos. 4,139,396, 4,283,313 and 4,370,453, the disclosures of which are incorporated herein by reference. The polymeric tertiary amine may be produced by reacting a partially epoxidized homopolymer or copolymer of butadiene having a molecular weight of 500 to 5,000, a carbon-to-carbon double bond content corresponding to an iodine number of 50 to 500 and an oxirane oxygen content of 3 to 12 % by weight with 30 to 300 millimoles per 100 g of the partially epoxidized butadiene polymer of an aliphatic secondary amine.

The resulting polymeric tertiary amine may be quarternized by reacting with a mono-epoxide compound in an amount of 0.4 to 1.0 equivalents relative to the tertiary amino groups in the presence of an acid.

Examples of mono-epoxide compounds include phenyl glycidyl ether, glycidyl acrylate, glycidyl methacrylate, 1,2-epoxybutane, glycidyl esters of saturated fatty acids and the like.

Usable acids are organic and inorganic acid having a pKa below 6. Examples of preferable acids include phosphoric acid, acetic acid and lactic acid. The amount of acid ranges from about one to about 16 moles, preferably from 2 to 10, moles per one equivalent of the tertiary amino group.

The reaction may be carried out in the presence of water and/or an organic solvent. The presence of a limited amount of water is preferable to achieve milder reactions. Organic solvents are preferably those acceptable in the finally formulated electrodeposition coating compositions and include alcohols, ketones and glycol ethers.

The polymeric tertiary amine may be reacted with the mono-epoxide compound after forming an acid-addition salt, or the two reactants may be reacted directly followed by neutralizing with the acid. Alternatively, all reactants may be reacted simultaneously. The reaction may be carried out at a temperature from 20° C. to 150° C., preferably from 50° C. to 120° C.

Pigment Paste

It has been discovered that the quarternized resin of this invention is highly suitable as a vehicle resin for preparing pigment pastes used in electrodeposition coating systems.

The pigment paste may be prepared in a conventional manner by dispersing pigment particles in an aqueous dispersion of the quarternized resin. The paste may contain conventional additives such as plasticizers, wetting agents, surfactants, defoaming agents and the like. Pigment particles may be dispersed in the vehicle by milling the mixture of various components in a mill such as ball mills, sand mills and the like until the pigment particles are milled to a suitable average size and preferably wetted by the vehicle. After milling the pigment particles generally have an average particle size less than 10 microns. Water must be present in such an amount that the aqueous vehicle forms a continuous phase. To this end the solid content of the vehicle generally ranges from 30 to 70 % by weight. The ratio of the quarternized resin to pigment may range from 1:1 to 1:5 by weight on dry basis.

Any conventional pigment may be incorporated into the pigment paste of this invention. Titanium dioxide may be a sole or primary white pigment. Other white pigments and extenders such as antimony oxide, zinc oxide, basic lead carbonate, basic lead sulfate, barium carbonate, China clay, calcium carbonate, aluminum silicate, silica, magnesium carbonate and magnesium silicate may be incorporated. Coloring pigments such as cadmium yellow, cadmium red, carbon black, phthalocyanine blue, chromium yellow, toluidine red and hydrated ferric oxide may also be incorporated.

The pigment paste thus prepared exhibits an excellent dispersibility and stability even at higher PVC contents.

ELECTRODEPOSITION COATING SYSTEM

The quarternized resin of the present invention may be incorporated as such or in the form of pigment paste to any known cathodic electrodeposition coating composition. Particularly, the resin may be incorporated into polybutadiene-based cathodic electrodeposition coating compositions of the type disclosed hereinbefore cited references to improve the smoothness and corrosion resistance (salt spray test) of finally cured coating films. The pigment paste may be incorporated to improve the storage stability of the entire coating compositions.

Such polybutadiene-based cathodic electrodeposition coating compositions comprise, in addition to the quarternized resin or the pigment paste, a tertiary amino group-containing polymer or its reaction product with an ethylenically unsaturated carboxylic acid disclosed in one of the hereinbefore cited reference, a reaction product of a polyphenol polyglycidyl ether with an ethylenically unsaturated carboxylic acid, and an oxide or organic acid salt of manganese, cobalt or copper.

Reaction products of polyphenol polyglycidyl ethers with ethylenically unsaturated carboxylic acids are generally known as epoxy acrylate resins. Examples of polyphenol polyglycidyl ethers include epoxy resins derived from bisphenol A, bisphenol F, novolac type phenol-formaldehyde condensates and the like. Examples of ethylenically unsaturated carboxylic acids include acrylic acid and methacrylic acid. These acids may be reacted in an approximately equivalent basis relative to the epoxy group.

Oxides or salts of manganese, cobalt or copper are added as a dryer. Organic acid salts such as formates, acetates, lactates, naphthenates and octanates are preferable, although oxides such as manganese dioxide may also be employed.

The proportions of these components generally ranges 10 to 100 parts by weight of the quarternized resin of this invention, 20 to 100 parts by weight of the reaction product of a polyphenol polyglycidyl ether with an ethylenically unsaturated carboxylic acid, and 0.005 to 1.0 parts by weight of a dryer calculated as elementary metals, respectively, per 100 parts by weight of the tertiary amino group-containing polymer or its reaction product with an ethylenically unsaturated carboxylic acid. When the final formulation contains the hereinbefore-defined pigment paste, the proportion of the quarternized resin may range from 5 to 100 parts by weight. The above proportions all are based on solid contents.

The coating composition of the present invention may be prepared by dissolving or dispersing the above components in an aqueous medium containing a neutralizing amount of a water-soluble organic acid such as acetic acid, propionic acid, lactic acid and the like. The aqueous medium may contain a water-miscible organic solvent such as ethylcellosolve, propylcellosolve, butylcellosolve, ethylene glycol dimethyl ether, diacetone alcohol, 4-methoxy-4-methylpentanone-2, methyl ethyl ketone and the like.

Enamels containing the pigment paste of this invention may be directly used in the cathodic electrodeposition coating. Pigment paste and pigment-free compositions may be used in the formulation of the above enamels or they may be used for replenishing purposes.

The invention is further illustrated by the following examples in which all percents are by weight.

PRODUCTION EXAMPLE 1

Quarternized Resin

| | |
|---|---|
| Epoxydized polybutadiene, E 1800-6.5 (Nippon Petrochemical Co., Ltd.) | 1000 g |
| Butylcellosolve | 349 g |
| Dimethylamine | 46 g |
| 50% Lactic acid | 138 g |
| Deionized water | 473 g |
| Phenyl glycidyl ether | 117 g |

An autoclave was charged with epoxidized polybutadiene E 1800-6.5, buthylcellosolve and dimethylamine. The mixtured was reacted at 150° C. for 5 hours. After unreacted dimethylamine was distilled off, the product was cooled to 60° C., diluted with a mixture of 50% lactic acid and deionized water, and then stirred at 80° C. for 30 minutes. Then phenyl glycidyl ether was added and the temperature was raised to 110° C. The reaction was continue at the same temperature with stirring until the acid number of the reaction product was less than 0.1 when titrating with alcoholic potassium hydroxide using phenolphthalein indicator.

PRODUCTION EXAMPLE 2

Tertiary Amino Group-Containing Resin (for comparison)

| | |
|---|---|
| E 1800-6.5 | 1000 g |
| Butylcellosolve | 265 g |
| Dimethylamine | 46 g |
| 50% Lactic acid | 138 g |
| Deionized water | 473 g |

An autoclave was charged with epoxidized polybutadiene E 1800-6 5, buthylcellosolve and dimethylamine. The mixture was reacted at 150? C. for 5 hours. After unreacted dimethylamine was distille off, the product was cooled to 60? C., diluted with 50 % lactic acid and deionized water, and then stirred at 80? C. for 30 minutes.

PRODUCTION EXAMPLE 3

Pigment Paste

| | |
|---|---|
| Varnish of Production Example 1 | 231 g |
| Deionized water | 383 g |
| Carbon black | 16 g |
| Titanium dioxide | 92 g |
| Kaolin | 220 g |
| Basic lead silicate | 58 g |

Varnish was dissolved in deionized water to make a solution. To the solution were added carbon black and other pigments and the mixture was stirred in a disperser for 1 hour. The mixture was further milled in a sand mill charged with glass beads until the average paticle size was less than 20 microns. Then the glass beads were filtered off to give pigment paste.

PRODUCTION EXAMPLE 4

Pigment Paste (for comparison)

The procedure of Production Example 3 was repeated except that the varnish of Production Example 1 was replaced by the varnish of Production Example 2.

PRODUCTION EXAMPLE 5

Resin Varnish A

An autoclave was charged with 1000 g of epoxidized polybutadiene E 1800-6.5, 354 g of butylcellosolve and 62.1 g of dimethylamine. The mixture was reacted at 150° C. for 5 hours. After unreacted dimethylamine was distilled off, the product was cooled to 120° C. To this were added 79.3 g of acrylic acid, 7.6 g of hydroquinone and 26.4 g of ethylcellosolve and the mixture was reacted at 120° C. for 3¾ hours. Resin Varnish A having an amine number of 85.2 millimoles/100 g, an acid number of 10.0 millimoles/100 g and a solid content of 75% was obtained.

PRODUCTION EXAMPLE 5

Resin Varnish B 1000 g of bisphenol type epoxy resin (EPITOTO YD 014, Toto Kasei Co., Ltd.) was dissolved in 247.4 g of ethylcellosolve. To the solution was added a mixture of 77.5 g of acrylic acid, 10 g of hydroquinone and 5 g of N,N-dimethylaminoethanol. The mixture was reacted at 105° C. for 5 hours to obtain Resin Varnish B.

EXAMPLES 1 and 2

| Component, g | Ex. 1 | Ex. 2 |
|---|---|---|
| Resin Varnish A | 120 | 120 |
| Resin Varnish B | 120 | 120 |
| Manganese acetate | 1 | 1 |
| Acetic acid | 2.5 | 2.5 |
| Deionized water (I) | 116.5 | 116.5 |
| Varnish of Production Example 1 | 34 | — |
| Varnish of Production Example 2 | — | 34 |
| Deionized water (II) | 606 | 606 |

Resin Varnish A and Resin Varnish B were placed in a stainless steel beaker and thoroughly mixed. After the manganese acetate and acetic acid were added, the mixture was diluted with deionized water (I) while stirring to give an aqueous solution having a nonvolatile content of 50 %.

To the solution was added the varnish produced in Production Example 1 or 2. The mixture was diluted with deionized water (H) while stirring to prepare a cathodic electrodeposition coating composition having a nonvolatile content of 20%.

Electrodeposition coating was carried out using the resulting coating composition on a cold-rolled steel plate surface-treated with a zinc phosphate based treating agent (GRANODINE SD2000, Nippon Paint Co., Ltd.) at a voltage of 150 V for 3 minutes. The deposited film was washed with water and baked in an oven at 165° C. for 20 minutes to give a cured film having a film thickness of 20 microns.

Evaluation results of cured films are shown in Table 1.

TABLE 1

| | Example 1 | Example 2 (for comparison) |
|---|---|---|
| Flim thickness, microns | 20 | 20 |
| Pencil hardness | H | HB |
| Cross-linking density,[1] mole/cc | $6.8 \times 10^{-4}$ | $6.0 \times 10^{-4}$ |
| 5% Salt spray test[2] | ○ | △ |

TABLE 1-continued

|  | Example 1 | Example 2 (for comparison) |
|---|---|---|
| Visual film smoothness | Good | Good |

(1)Automatic viscoelasticity meter RHEOVIBRON DDV-II-EA sold by Toyo Baldwin Co., Ltd. was used. Measurement was made at a temperature elevation rate of 3° C./min. and at 11 Hz.
(2)Judged by the maximum width of rust developed from the cut edge of the applied film.
⊙less than 1 mm; ○1–2 mm; Δ 2–3 mm; X greater than 3 mm.

EXAMPLES 3 and 4

| Components, g | Ex. 3 | Ex. 4 |
|---|---|---|
| Resin Varnish A | 100 | 100 |
| Resin Varnish B | 100 | 100 |
| Manganese acetate | 1 | 1 |
| Acetic acid | 2.5 | 2.5 |
| Deionized water (I) | 96.5 | 96.5 |
| Pigment paste of Production Ex. 3 | 80 | — |
| Pigment paste of Production Ex. 4 | — | 80 |
| Deionized water (II) | 620 | 620 |

Resin Varnish A and Resin Varnish B were placed in a stainless steel beaker and thoroughly mixed. After the manganese acetate and acetic acid were added, the mixture was diluted with deionized water (I) while stirring to give an aqueous solution having a nonvolatile content of 50%.

To the solution was added pigment paste produced in Production Example 3 or 4. The mixture was diluted with deionized water (II) while stirring to prepare a cathodic electrodeposition enamel having a nonvolatile content of 20%. When the enamel was filtered through a 400 mesh wire screen, no agglomerate was collected.

Electrodeposition coating was carried out using the resulting enamel on a cold-rolled steel plate used in Examples 1 and 2 at a voltage of 200 V for 3 minutes. The deposited film was washed with water and baked in an oven at 165° C. for 20 minutes to give a cured film having a film thickness of 20 microns. Abnormalities such as pinholes and agglomerates were not observed upon visual inspection.

In order to evaluate stability, the enamel was placed in a stainless beaker and aged for one month with continued stirring in a water bath kept at 30±1° C. The results are shown in Table 2.

TABLE 2

| Storage time | Test items | | Example 3 | Example 4 (for comparison) |
|---|---|---|---|---|
| Initial time | 400 mesh screen passing(1) | | ⊙ | ⊙ |
| | Visual inspection(2) of cured film | Vertical | ⊙ | ⊙ |
| | | Horizontal | ⊙ | ⊙ |
| After 1 month storage at 30° C. | 400 mesh screen passing | | ○ | X |
| | Visual inspection of cured film | Vertical | ⊙ | ○ |
| | | Horizontal | ○ | X |

(1)Enamel liquid (2 kg in total) was filtered through a 400 mesh wire screen (800 cm² area). The resulting retenate was dried at 100° C. for three hours and weighed.
⊙less than 1 g
○ 1–4 g
Δ 4–10 g
X greater than 10 g
(2)Substrate plate was immersed in the coating bath either vertically or horizontally. Electrodeposition coating was carried out as defined and the resulting cured film was visually inspected to count the number of pinholes and agglomerates per 100 cm².
⊙less than 1
○ 1–5
Δ 5–20
X greater than 20

We claim:
1. A cathodic electrodeposition coating composition which comprises:
(A) 100 parts by weight of a tertiary amino group-containing film-forming polymer derived from partially epoxidized homopolymer or copolymer of butandiene having a molecular weight of 500 to 5,000 and an aliphatic amine, optionally followed by reacting with an ethylenically unsaturated polymerizable carboxylic acid;
(B) 20 to 100 parts by weight of a reaction product of a polyphenol polyglycidyl ether with an ethylenically unsaturated polymerizable carboxylica acid;
(C) 0.005 to 1.0 parts as elementary metal by weight of an oxide or organic acid salt of manganese, cobalt or copper;
(D) 5 to 100 parts by weight of a cationic water-dispersible resin having quaternary ammonium groups, said cathionic water-disperible resin being a product produced by reacting (a) an acid-addition salt of a polymeric tertiary amine derived from a partially epoxidized homopolymer or copolymer of butadiene having a molecular weight of 500 to 5,000 and an aliphatic secondary amine, and (b) a mono-epoxide compound; said components (A) to (D) being dissolved or dispersed in an aqueous medium containing an amount of an organic acid sufficient to neutralize said component (A).

2. The coating composition according to claim 1, wherein said partially epoxidized homopolymer or copolymer of butadiene has a carbon-to-carbon double bond content corresponding to an iodine number of 50 to 500 and an oxirane oxygen content of 3 to 12% by weight.

3. The coating composition according to claim 2, wherein said aliphatic teriary amine is reacted in an amount of 30 to 300 millimoles per 100 g of said partially epoxidized butadiene polymer.

4. The coating composition according to claim 3, wherein said mono-epoxide is phenyl glycidyl ether, glycidyl acrylate, glycidyl methacrylate, 1,2-epoxybutane or glycidyl ester of a saturated fatty acid.

5. The coating composition according to claim 4, wherein said mono-epoxide is reacted with said polymeric teriary amine in an amount of 0.4 to 1.0 equivalents relative to the tertiary amino group.

6. The coating composition according to claim 1, wherein said ethylenically unsaturated polymerizable carboxylic acid is acrylic acid or methacrylic acid.

7. The coating composition according to claim 1, wherein said component (B) is acrylate or methacrylate of a bisphenol epoxy resin or novolac epoxy resin.

8. The coating composition according to claim 1 further comprising a pigment, said component (D) and said pigment forming a pigment paste composition at a weight ration of 1:1 to 1:5 on dry basis.

* * * * *